United States Patent
Collis

(10) Patent No.: US 9,445,550 B2
(45) Date of Patent: Sep. 20, 2016

(54) VERTICAL GARDEN SYSTEMS AND METHODS

(75) Inventor: Stephen Collis, Victoria (AU)

(73) Assignee: VERTICALGARDENUSA.COM LLC, Las Vegas, NV (US)

( * ) Notice: Subject to any disclaimer, the term of this patent is extended or adjusted under 35 U.S.C. 154(b) by 94 days.

(21) Appl. No.: 14/232,917

(22) PCT Filed: Jul. 16, 2012

(86) PCT No.: PCT/AU2012/000856
§ 371 (c)(1),
(2), (4) Date: May 5, 2014

(87) PCT Pub. No.: WO2013/010216
PCT Pub. Date: Jan. 24, 2013

(65) Prior Publication Data
US 2014/0230325 A1    Aug. 21, 2014

(30) Foreign Application Priority Data

Jul. 15, 2011   (AU) ................................ 2011902829

(51) Int. Cl.
*A01G 25/00*   (2006.01)
*A01G 9/02*    (2006.01)

(52) U.S. Cl.
CPC .............. *A01G 9/022* (2013.01); *A01G 9/023* (2013.01); *A01G 9/025* (2013.01); *Y02P 60/244* (2015.11)

(58) Field of Classification Search
CPC ......... A01G 9/022; A01G 9/023; A01G 9/25
See application file for complete search history.

(56) References Cited

U.S. PATENT DOCUMENTS

| | | | | |
|---|---|---|---|---|
| 2,720,056 A | * | 10/1955 | Levy ..................... | A47G 7/044 362/122 |
| 4,203,373 A | * | 5/1980 | Conti .................... | A47B 57/06 108/108 |
| 7,837,165 B2 | * | 11/2010 | Stone .................... | A47G 7/044 224/414 |
| 7,877,927 B2 | * | 2/2011 | Roy ...................... | A01G 31/02 47/62 A |
| 7,931,160 B2 | * | 4/2011 | Newbouild ............ | A47B 57/08 211/119.009 |
| 8,136,296 B2 | * | 3/2012 | Hogan ................. | A01G 27/003 47/39 |
| 2007/0194189 A1 | * | 8/2007 | Stone .................... | A47G 7/044 248/220.21 |
| 2009/0000189 A1 | * | 1/2009 | Black .................... | A01G 27/02 47/82 |
| 2009/0107042 A1 | * | 4/2009 | Nunes ................... | A01G 9/025 47/83 |
| 2014/0325907 A1 | * | 11/2014 | Meyer .................. | A01G 9/025 47/82 |

* cited by examiner

*Primary Examiner* — Kristen C Hayes
(74) *Attorney, Agent, or Firm* — Garcia-Zamor IP Law; Ruy M. Garcia-Zamor

(57) ABSTRACT

A garden module for a vertical garden system, the module comprising: a body having a back portion providing a mounting arrangement in the form of one or more vertically extending recessed portions. A vertical garden system comprising: a plurality of garden modules; at least one upright; each garden module having a back portion providing a mounting arrangement in the form of one or more vertically extending recessed portions for accommodating a respective one of the at least one upright.

20 Claims, 9 Drawing Sheets

VERTICAL GARDEN SYSTEMS AND METHODS

CROSS REFERENCE TO RELATED APPLICATIONS

This application claims priority to the following patent applications: (1) Patent Cooperation Treaty Application PCT/AU2012/000856, filed Jul. 15, 2011; the above cited application is hereby incorporated by reference herein as if fully set forth in its entirety.

FIELD OF THE INVENTION

The present invention relates to vertical garden systems and methods. In one preferred form the present invention relates to a garden module for a vertical garden system.

BACKGROUND TO THE INVENTION

There are presently a number of vertical garden systems available on the market. Such vertical garden systems tend suffer from a number of problems.

For example vertical garden systems using the matt pocket and bag method suffer from problems associated with: (i) there being a very limited number of plant varieties suitable for growing horizontally; (ii) being arranged to provide a relatively small amount of growing medium, which limits plant growth and life; (ii) requiring liquid nutrients to extend plant growth and life due to unnatural growing conditions; (iii) unpleasant odours being created by the use of significant amounts of liquid nutrients; (iv) requiring relatively high maintenance to maintain irrigation and encourage healthy plant growth; (v) requiring expensive matt pocket and bag kits costing upwards of say A$300 per square meter; (vi) having a relative high watering demand to encourage plant growth; and (vii) being relatively difficult to manufacture and install.

SUMMARY OF THE INVENTION

According to a first aspect of preferred embodiments herein described there is provided a garden module for a vertical garden system, the module comprising: a body having a back portion providing a mounting arrangement in the form of one or more vertically extending recessed portions.

Preferably each vertically extending recessed portion extends substantially over the full height of the back portion and is configured to accommodate a respective upright of the vertical garden system.

Preferably each vertically extending recessed portion includes an attachment portion for allowing attachment of the recessed portion to the corresponding upright of the vertical garden system, the attachment portion allowing for ready, installation and replacement of the garden module in the vertical garden system.

Preferably each attachment portion comprises an aperture provided in the upper portion of the corresponding vertically extending recessed portion, each aperture being provided as a keyhole for receiving a fastener in a manner extending through the keyhole into the corresponding upright of the vertical garden system.

Preferably the module includes precisely two recessed portions for accommodating the respective uprights of the vertical garden system, the aperture provided in the upper portion of each vertically recessed portion advantageously allowing for the vertical height of the garden module to be readily varied in the vertical garden system.

Preferably the vertical height of the garden module can be readily varied, in use, by sliding the garden module vertically up and down the uprights and then securing the garden module in position.

Preferably the garden module is formed from plastics material and each vertically extending recessed portion diverges in a downward direction to assist with release of the garden module during forming.

Preferably when installed, a forward upper lip of a front portion of the body is located below the upper lip of the back portion of the body to provide an opening angle of between 15 and 30 degrees below horizontal.

Preferably the body includes a base portion, the base portion including a number of outlets spaced along the base portion to provide a top down watering arrangement, when the garden module is located above a lower garden module in the vertical garden system, such that water accumulating in the garden module is able to exit through the outlets and is directed towards the lower garden module.

Preferably the base portion includes a lower accumulation portion shaped for ensuring that water exiting through the outlets does not travel back towards the back portion of the body where the water could damage a supporting wall or an upright.

Preferably the lower accumulation portion has a radius of curvature for ensuring that water exiting through the outlets does not travel back towards the back portion of the body where the water could damage a supporting wall or upright.

Preferably the lower accumulation portion is inclined at an angle of more than 20 degrees and provides an internal acute angle of less than 90 degrees.

Preferably the module is at least 0.5 m in length.

Preferably the module is designed to accommodate at least 0.02 m3 of growing medium.

According to a second aspect of preferred embodiments herein described there is provided a vertical garden system comprising: a plurality of garden modules; at least one upright; each garden module having a back portion providing a mounting arrangement in the form of one or more vertically extending recessed portions for accommodating a respective one of the at least one upright.

Preferably each vertically extending recessed portion extends substantially over the full height of the back portion for accommodating the respective upright of the vertical garden system.

Preferably the at least one upright comprises precisely two uprights, with each garden module having precisely two vertically extending recessed portions for accommodating respective uprights.

Preferably each vertically extending recessed portion of the garden modules includes an attachment portion for allowing attachment of the recessed portion to the corresponding upright, the attachment portions allowing for ready, installation and replacement of the garden modules in the vertical garden system.

Preferably each attachment portion comprises an aperture provided in the upper portion of each corresponding vertically extending recessed portion, each aperture being provided as a keyhole for receiving a fastener that extends through the keyhole into the corresponding upright of the vertical garden system.

Preferably each module includes precisely two vertically extending recessed portions for accommodating respective uprights of the vertical garden system, the aperture provided in the upper portion of each vertically extending recessed portion advantageously allowing for the vertical height of the garden module to be readily varied in the vertical garden system.

Preferably the vertical height of each garden module can be readily varied, in use, by sliding the garden module vertically up and down the uprights as the spacing between the garden modules permits.

Preferably each garden module is formed from plastics material and each vertically extending recessed portion diverges in a downward direction to assist with release of the garden module during forming.

Preferably each garden module when installed has a forward upper lip of a front portion located below the upper lip of the back portion of the body of the garden module to provide an opening angle of between 15 and 30 degrees below horizontal.

Preferably at least some of the garden modules comprise watering garden modules each including a base portion having a number of outlets spaced along the base portion to provide a top down watering arrangement when the watering garden module is located above a lower garden module in the vertical garden system such that water accumulating in the watering garden module is able to exit through the outlets in the base portion thereof and is directed towards the lower garden module.

Preferably the base portion of each watering garden module includes a lower accumulation portion shaped for ensuring that water exiting through the outlets of the base portion does not travel back towards the back portion of the body of the watering garden module where the water could damage a supporting wall or upright.

Preferably the lower accumulation portion of each watering garden module has a radius of curvature for ensuring that water exiting through the outlets of the watering garden module does not travel back towards the back portion of the body where the water could damage a supporting wall or upright.

Preferably each garden module is at least 0.5 m in length.

Preferably each garden module is designed to accommodate at least 0.02 m3 of growing medium.

According to a third aspect of preferred embodiments herein described there is provided a method of installing a vertical garden system comprising:
 fixing at least one upright so as to extend vertically above the ground;
 providing a plurality of garden modules each having a body with a back portion providing a mounting arrangement in the form of one or more vertically extending recessed portions for accommodating a respective upright of the at least one upright;
 positioning each garden module such that each vertically extending recessed portion thereof accommodates a respective upright; and
 removably fixing the garden modules in position by securing fasteners through the garden modules into the uprights.

Preferably the method includes applying an irregular spacing between the garden modules by sliding at least one of the garden modules vertically up or down the uprights to an irregular position; and fixing the garden position in said position.

As will be discussed in further detail below, embodiments of the present invention are considered to provide a number of preferred arrangements including:
 (i) Vertical garden systems having modules that are relatively readily installed and which do not require relatively complicated matt pocket and bag kits.
 (ii) Vertical garden systems that encourage natural plant growth and provide a relatively large amount of growing medium.
 (iii) Vertical garden systems that do not require relatively large amounts of liquid nutrients typically associated with unpleasant odours.
 (iv) Vertical garden systems that are relatively readily manufactured and maintained and which provide a relatively natural method of growing so as to make the system particularly suited to the householder enjoying a vertical garden.
 (v) Vertical garden systems in which plants are able to grow naturally in a relatively large amount of growing medium with the plants in each garden module growing vertically to cover the garden module above and create a continuous wall of plants.
 (vi) Vertical garden systems that are considered not to require relatively large amounts of liquid nutrient and which are considered, as a result, to have a relatively pleasant much improved odour.

Further advantages and preferred features of embodiments of the present invention will be apparent from the drawings and a reading of the specification as a whole.

BRIEF DESCRIPTION OF DRAWINGS

In order to facilitate a better understanding of the present invention, several preferred embodiments will now be described with reference to the accompanying drawings, in which.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1A:
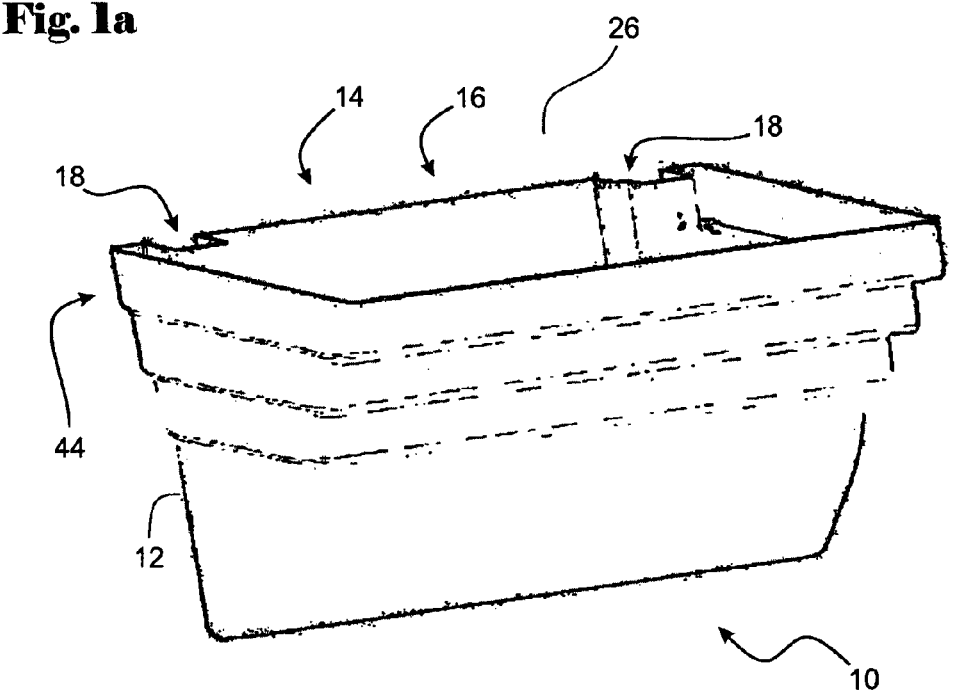
FIGS. 1a and 1b provide a perspective view of a garden module according to a first preferred embodiment of the present invention.
Figure 1B:
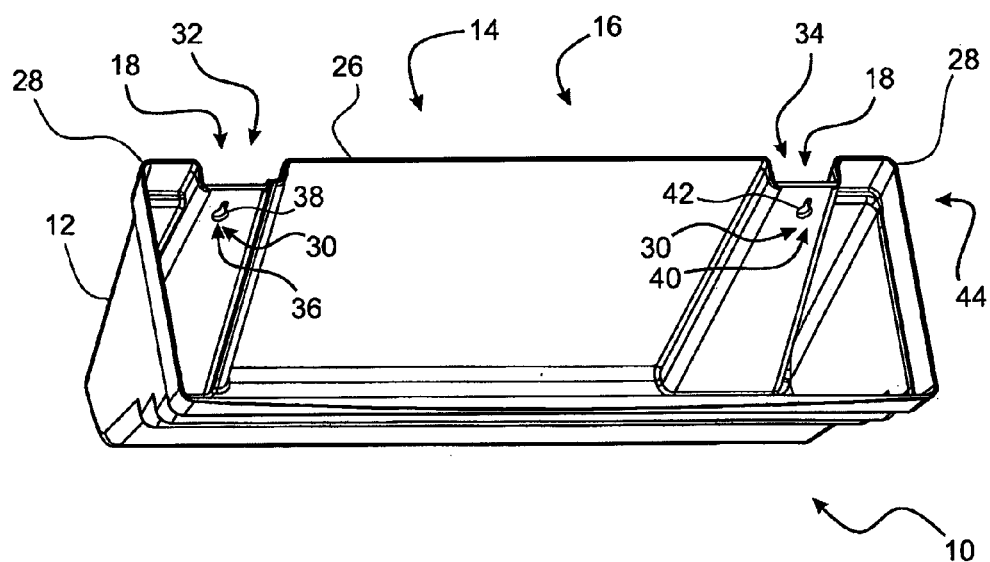

Referring to FIGS. 1a and 1b, there is shown a garden module 10 for a vertical garden system, the garden module 10 according to a first preferred embodiment of the present invention. In comparison to conventional matt and bag systems, the garden module 10 is considered to provide a number of advantages.

As shown in FIGS. 1a and 1b, the garden module 10 includes a body 12 having a back portion 14 providing a mounting arrangement 16. The mounting arrangement 16 is provided in the form of two vertically extending recessed portions 18. Each of the vertically extending recessed portions 18 extends over the full height of the back portion 14 of the garden module 10.

Figure 2:
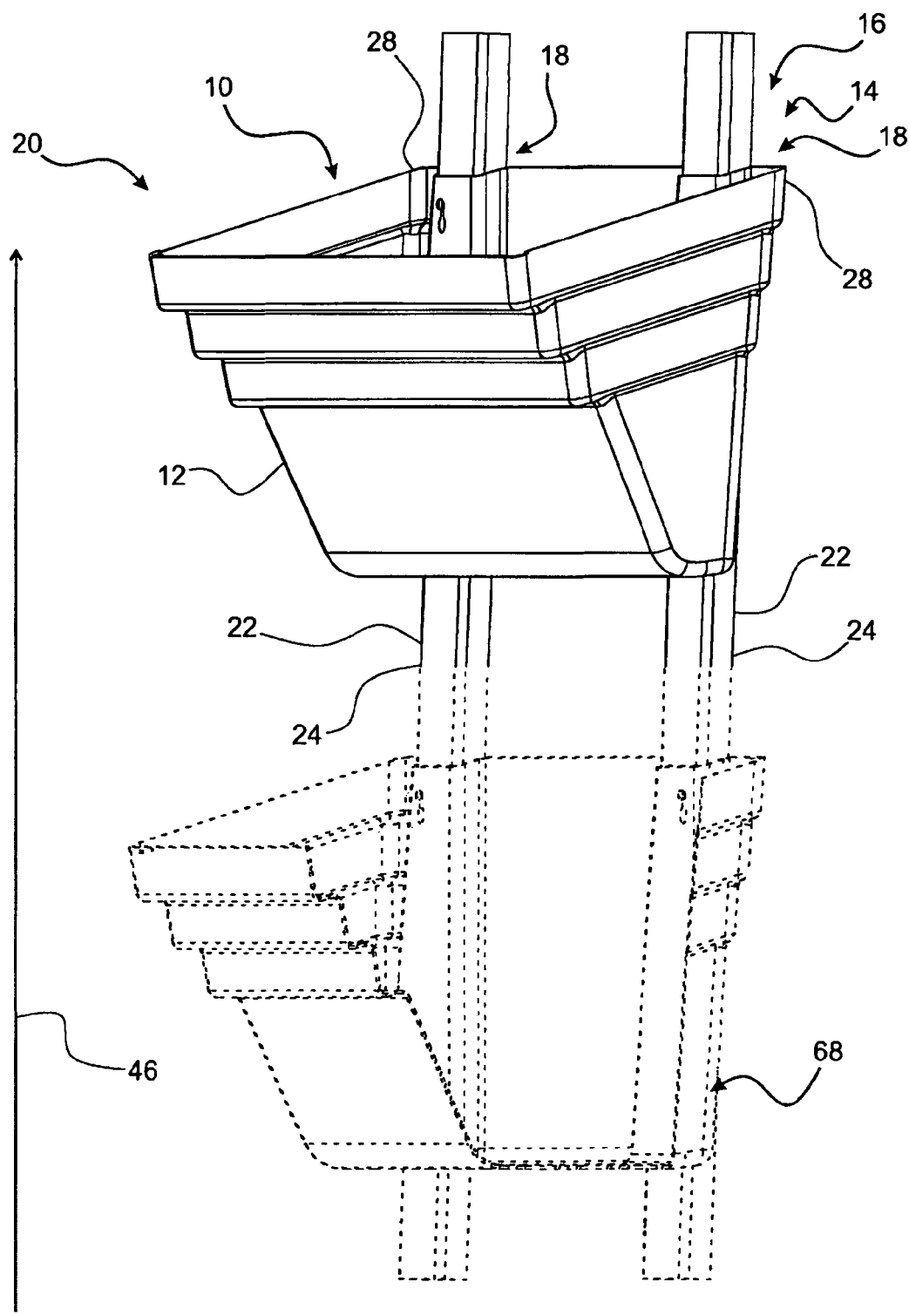
FIG. 2 provides a perspective view of the garden module shown in FIG. 1, with the garden module forming part of a vertical garden system.

FIG. 2 illustrates the garden module 10 in position within a vertical garden system 20. As shown, each recessed portion 18 is configured to accommodate a respective upright 22 forming part of the vertical garden system 20. The uprights 22 comprise two parallel vertically extending lengths 24 of substantially rectangular cross section. In the embodiment each of the vertically extending recesses comprise three walls forming a U type shaped cross-section sized to closely fit the uprights 22. In other possible embodiments the recessed portions could of course comprise two walls forming an L type shape. Recesses having cross sections of other shapes could also be used.

In the present embodiment the U shaped cross-sections of the vertically extending recessed portions 18 are separated by an outwardly extending section 26. As would be apparent, the section 26 when in use is disposed therebetween in the near vicinity of or abutting a wall (not shown) to which to uprights 22 are fastened.

In the garden module 10, two corner lengths 28 are provided either side of the recessed portions 18. The corner lengths 28 extend over the full height of the back portion 14 of the garden module. Similarly to the section 26, the corner lengths 28 are configured to be disposed in the near vicinity of or abut against the wall (not shown).

As shown in FIGS. 1a and 1b, each vertically extending recessed portion 18 includes an attachment portion 30. Each attachment portion 30 advantageously allows attachment of the garden module 10 to a corresponding upright 22. More particularly, in the embodiment, the vertically extending recessed portions 18 comprise a first recessed portion 32 and a second recessed portion 34, disposed on opposite sides of the garden module 10. The first recessed portion 32 includes a first attachment portion 36 in the form of a keyhole 38. The second recessed portion 34 includes a second attachment portion 40 in the form of a keyhole 42.

The keyholes 38, 42 are provided as apertures in the upper portions 44 of the corresponding vertically extending recessed portions 18. The keyholes 38, 42 are each advantageously adapted to receive a fastener in the form of a threaded screw that extends through a respective keyhole 38, 42 into the corresponding upright 22 of the vertical garden system 20.

Advantageously the recessed portions 18 and the keyholes 38, 42 are considered to advantageously allow for the vertical height 46 of the garden module 10 to be readily varied in the vertical garden system 20. In addition they are considered to provide for the ready, installation and replacement of the garden module 10 in the vertical garden system 20.

In terms of the adjustment of the vertical height 46, this is achieved by removing the fasteners from the keyholes 38, 42 and then sliding the garden module 10 vertically up and down the uprights 22 to a desired position. As part of the relocation process the vertically extending portions 18 assist with guiding the module 10. The user is able to push against the wall (not shown) with the recess portions 18 providing an abutment against the uprights 22 to prevent sideways movement of the garden module 10. In order to secure the module 10 in position, the fasteners are then screwed back through the keyholes 38, 42 into the uprights 22. The fixing method of the mounting arrangement 16 with the vertically extending recessed portions 18 is considered to allow relatively easy movement and positioning of the garden module 10.

As indicated above, the garden module 10 can be removed from the vertical garden system 20. Once removed the garden module 10 can be placed in an accessible working position on a table. The garden module 10 can also be replaced with a pre-planted garden module. Modules, in the vertical garden system 20, can also be moved for presentation purposes.

Figure 3A:
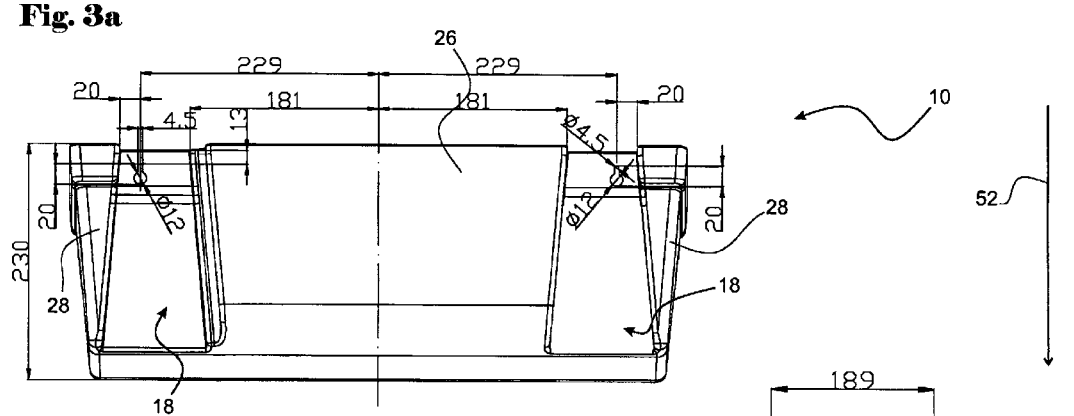
FIGS. 3a to 3c provides several further views of the garden module shown in FIG. 1.
Figure 3B:
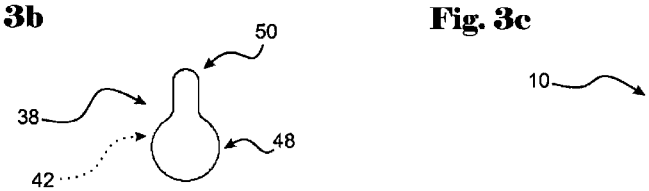
Figure 3C:
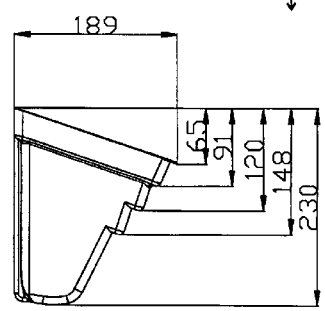

Referring to FIGS. 3a to 3c, the keyholes 38, 42 are provided with a first portion 48 for receiving the head of a fastener and a second portion 50 for receiving the shaft of the fastener. When the garden module 10 is mounted in position, the second portion 50 advantageously serves to hold the garden module 10 in position under its own weight. To remove the garden module 10 without removing the fasteners the module is simply lifted upwardly and pulled away from the uprights 22 with the heads of the fasteners moving through the first portions 48.

In the embodiment, the garden module 10 is advantageously formed from plastics material. Furthermore, each vertically extending recessed portion 18 diverges in a downward direction 52 to assist with the release of the garden module 10 from the mould during forming. The lateral walls of each vertically extending recessed portion 18 taper upwardly to a position at which the walls are relatively adjacent the sides of the uprights 22.

The uprights 22, themselves, can be fixed to a wall using conventional mounting methods. Suitable uprights can be readily purchased as wooden lengths from a conventional hardware store.

In the vertical garden system 20, the use of uprights 22 and multiple garden modules 10 is considered to provide a system that is 'do it yourself' friendly in both installation and operation. As discussed modules can be readily moved to bench height, filled with potting mix, plants and water. Following this, modules can then be moved and fixed in a desirable position on the uprights 22. In terms of fastening attachments for the garden modules and uprights 22, they are considered to employ the simplest and most readily available components from any hardware store. In comparison to matt pocket and bag methods, the present embodiment is considered to be particularly advantageous. The overall cost is considered to be particularly low and possibly retail at $150 per square meter.

The sizing of the present embodiment is shown in FIGS. 3a to 3c. The length of the garden module is advantageously about 600 mm long, 230 mm high and 190 mm wide. Other preferred embodiments may be between 500 to 800 mm long. Other lengths are of course possible. It is preferred that the garden module 10 is readily carried by one or 2 persons.

Figure 4:
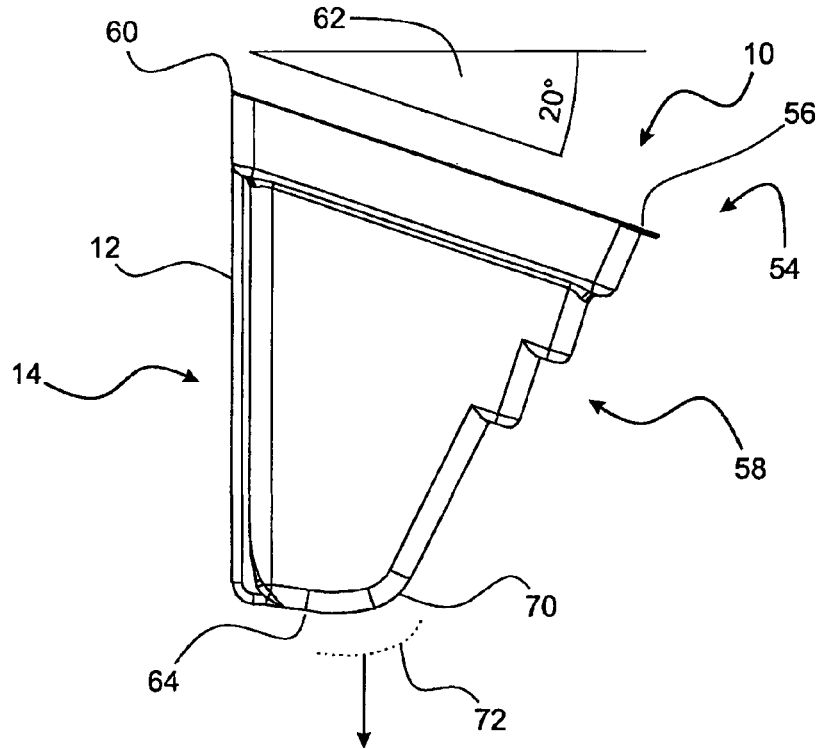
FIG. 4 provides a cross sectional view of the garden module shown in FIG. 1.

As shown in FIG. 4, the garden module 10 provides upper rim 54 considered to be conducive to plant growth. More particularly, when installed, the garden module 10 provides a forward upper edge 56 of a front portion 58 that is located below the upper edge 60 of the back portion 14. This advantageously provides an opening angle 62 of about 20 degrees below horizontal. With an opening of about 20 degrees sunlight penetration is encouraged as is forward plant growth overhanging the forward upper edge/lip 56. As with the mounting arrangement 16, this is considered to be particularly advantageous.

Figure 5:
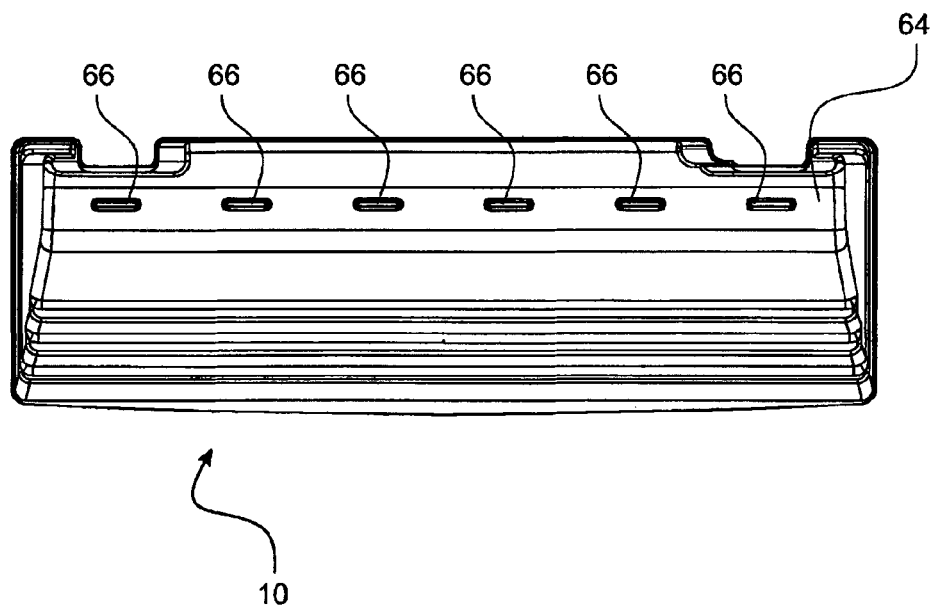
FIG. 5 provides a top view of the garden module shown in FIG. 1.
Figure 6:
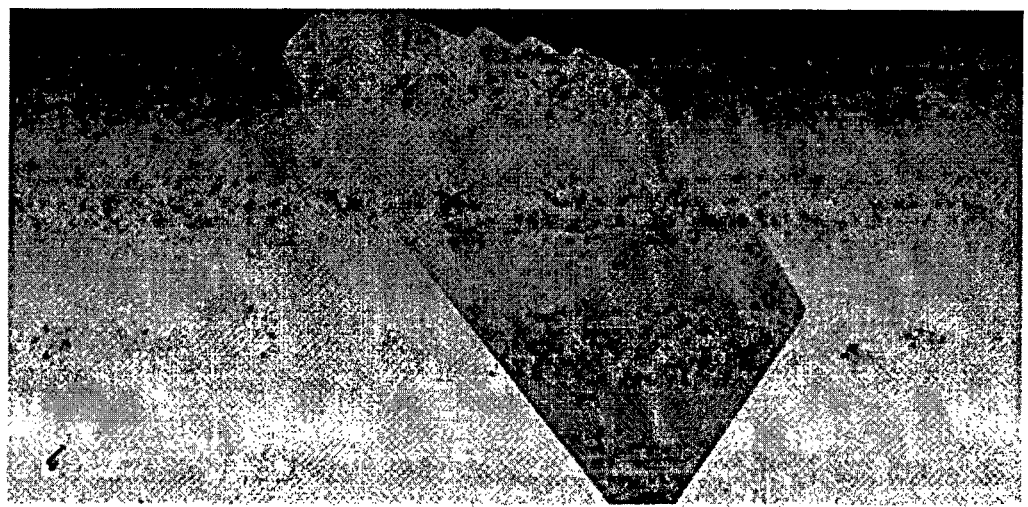
FIG. 6 provides a rear perspective view of the garden module shown in FIG. 1.
Figure 6:
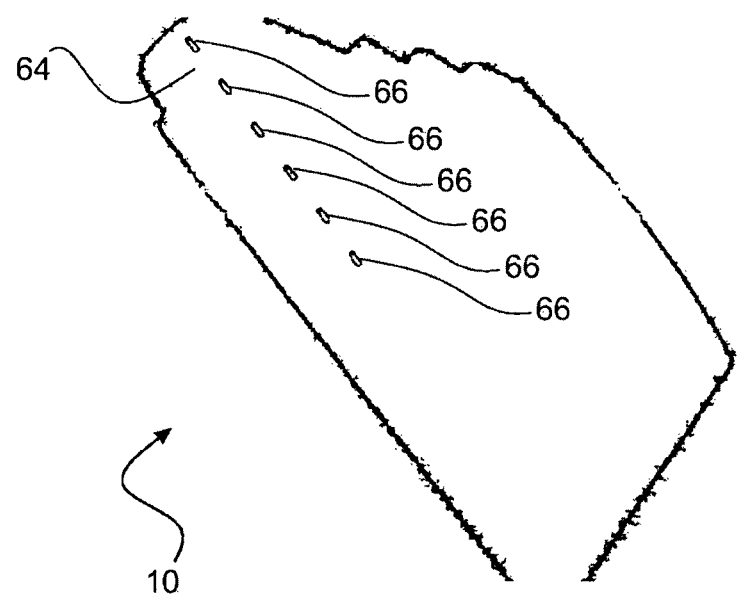

As shown in FIGS. 4 to 6, the body 12 of the garden module 10 includes a base portion 64. The base portion 64 includes a number of outlets 66. The outlets 66 are spaced along the base portion 64 to advantageously provide a top down watering arrangement. The top down watering arrangement is provided when the garden module 10 is located above a lower garden module 68 (See FIG. 2). As a result of the top down watering arrangement, water accumulating in the garden module 10 is able to exit through the outlets 66 and is directed towards the lower garden module 68. Water is accordingly able to advantageously propagate through the system.

As highlighted in FIG. 4, the base portion 64 includes a lower accumulation portion 70 advantageously shaped for ensuring that water exiting through the outlets 66 does not travel back towards the back/portion 14 of the body 12 where the water could damage a supporting wall or an upright 22. The lower accumulation portion 70 has a slight radius of curvature 72 for ensuring that water exiting through the outlets 66 does not travel back towards the back portion 14 as explained above.

As shown the outlets 66 are relatively evenly spaced along the base portion 64 at regular intervals. As a result, in the vertical garden system 20 water drains from the top garden module to the module below in a relatively even fashion. The vertical garden system 20 is designed to accept common low cost poly tube and fittings for use in the top down watering system. This is considered to be a significant advantage over mat and bag methods which require complicated irrigation to try to cover each pocket or bag.

The design incorporates, a half rounded recess moulded into the rear, to allow irrigation tube to pass between the container and the vertical surface, thus retaining the modularity without disassembling the irrigation system.

With the present arrangement the garden module 10 is advantageously designed to accommodate at least 0.01 m$^3$ of growing medium for the 600 mm length (0.017 m$^3$/m). Growth medium densities of 0.02 m$^3$/m to 0.04 m$^3$/m are preferred. The applicant considers that, in comparison to the volume of growing medium/square meter in the conventional matt pocket and bag methods, this should advantageously provide a significant multiple of growth, life, and plant variety without relying on liquid nutrient as is presently the case. This is presently being confirmed by the applicant. Finished products having 0.02 cubic meters are preferred as are plan dimensions divisible into 1200×2400 mm.

Figure 7:
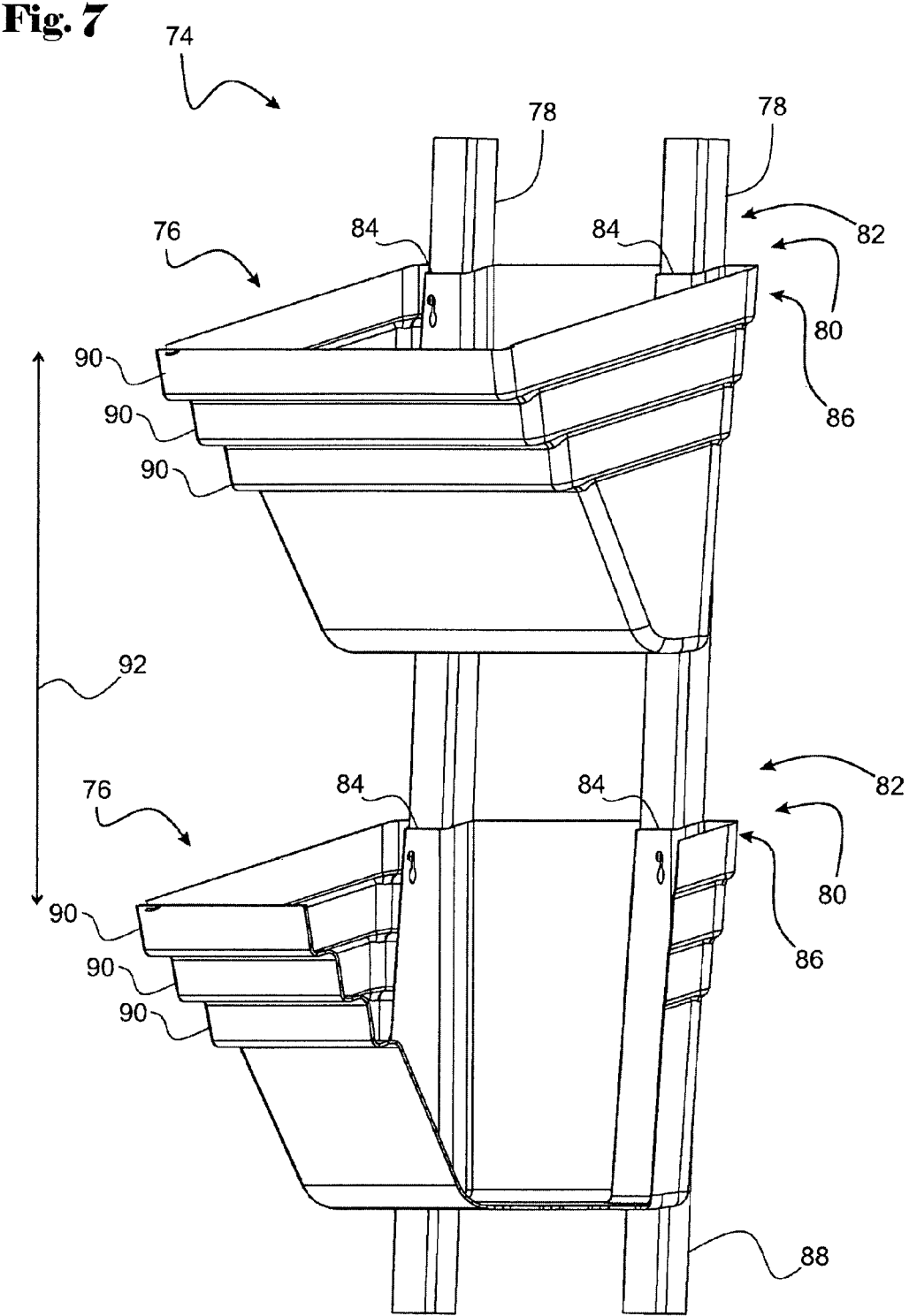
FIG. 7 provides a perspective view of a vertical garden system according to another preferred embodiment of the present invention.

FIG. 7 illustrates a similar vertical garden system 74 according to a further embodiment of the present invention in its own right. The vertical garden system 74 comprises a plurality of garden modules 76 and two uprights 78. Each garden module 76 has a back portion 80 providing a mounting arrangement 82 in the form of two vertically extending recessed portions 84 for accommodating a respective one of the uprights 78. In the embodiment the recessed portions 84 are of a similar cross section to the uprights 78 at the upper potion 86 of the recessed portions 84 to advantageously assist with locating the modules 76 on the uprights 78.

The vertical garden system 74 is considered to provide plants with improved growing conditions and to reduce the required maintenance. Furthermore, the system is considered to provide significant advantages over mat and bag methods including those involving modular crates. Such systems generally rely on water from the top to the bottom combining gravity and wick method of irrigation. In comparison the vertical garden system of the present embodiment provides a top down watering system directed by the bases of the garden modules, the flow irrigation being assisted by gravity from one to another through openings moulded in the bases. In particular embodiments the base in the area of these openings has a radial curvature to ensure the irrigation water passes to the container below and inhibits moisture contact with the vertical surface the container is attached to. Furthermore, to inhibit growth material passing through the openings, each container is supplied with a rectangle of coco fibre mat.

In addition to the above, conventional matt and bag systems provide little growing medium (potting mix) to each root system which results in a relatively short and stunted plant life. To compensate nutrient is typically added to the irrigation water which can result in an unpleasant odour. In comparison the vertical garden system 74 is designed to grow plants in soil and/or nutrient enriched potting mix therefore increasing the plant life and growth compared to the bag method.

The vertical gardening system 74 advantageously provides a modular container system in which plants can be grown in a more natural growth material to cover a vertical wall surface. Of course, the garden modules 76 may be constructed of any suitable material such as metal, wood or plastic. In this particular embodiment the modules are injection moulded from talc filled polypropylene.

In the injection moulding process the modules are designed with one or more recesses in the rear and have a keyhole moulded into the innermost wall of the recess. In this embodiment the recesses fit around corresponding posts (uprights 78), which are fastened to the vertical surface 88. The recesses fits a 66 mm×19 mm treated pine, vertical uprights.

The modules 76 each provide three ribbed portions 90 which by their ribbed shaping, construction material and varied material thickness, ensures the container functions without distortion or failure under the loading of normal plant growth, irrigation and associated loading.

Advantageously, the mounting/screw position can be moved to incorporate a variable distance 92 between modules to allow for different sized plant growth. Furthermore, the designed modularity with the keyhole, allows ease of movement of containers for, say, placement for presentation and planting or re-planting.

The plant growth is assisted by the angled shape of the container (the angle from the horizontal of the top of the container and the angle from the horizontal of the bottom of the container above or below) which forms an opening conducive to plant growth outwards, to cover a total vertical surface.

Figure 8A:
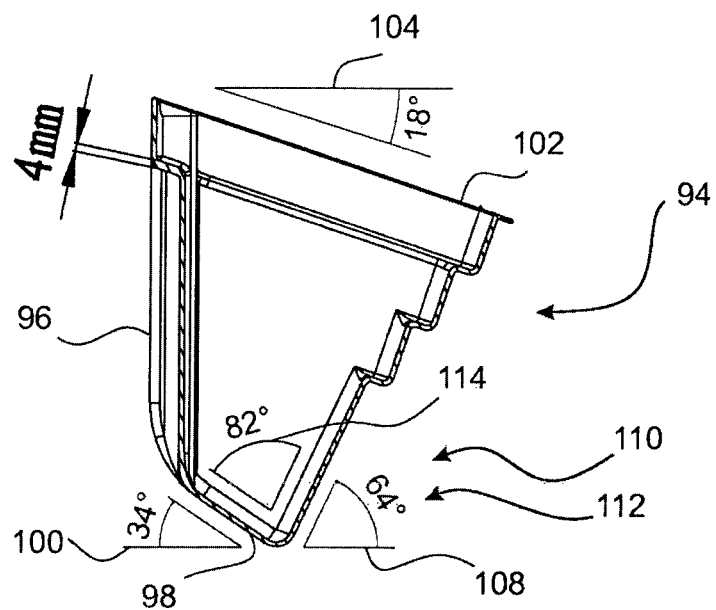
FIGS. 8a to 8b and 9 provide several views of a garden module according to a further preferred embodiment of the present invention.
Figure 8B:
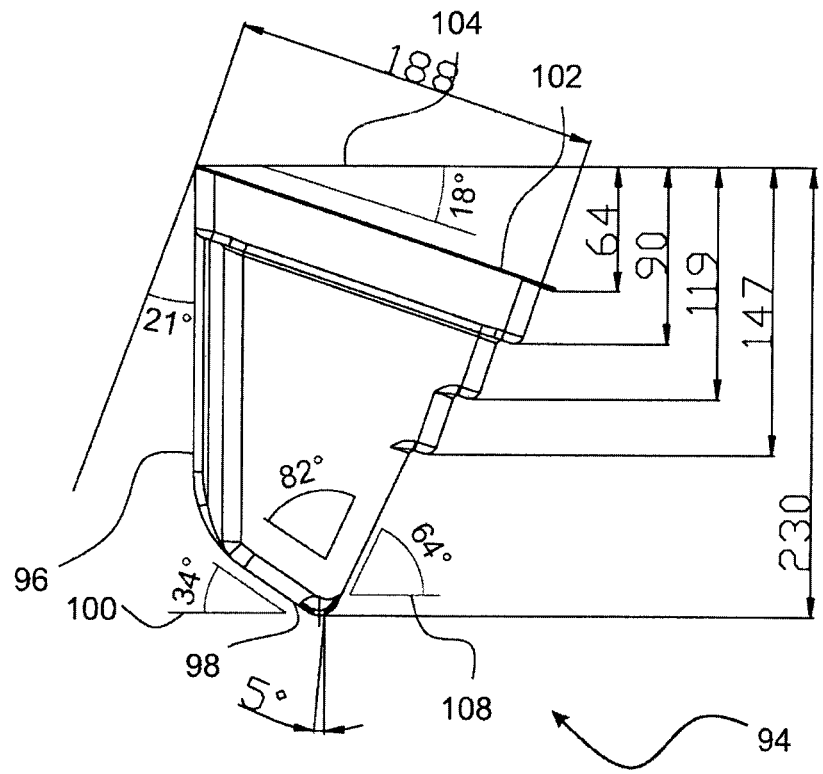
Figure 9:
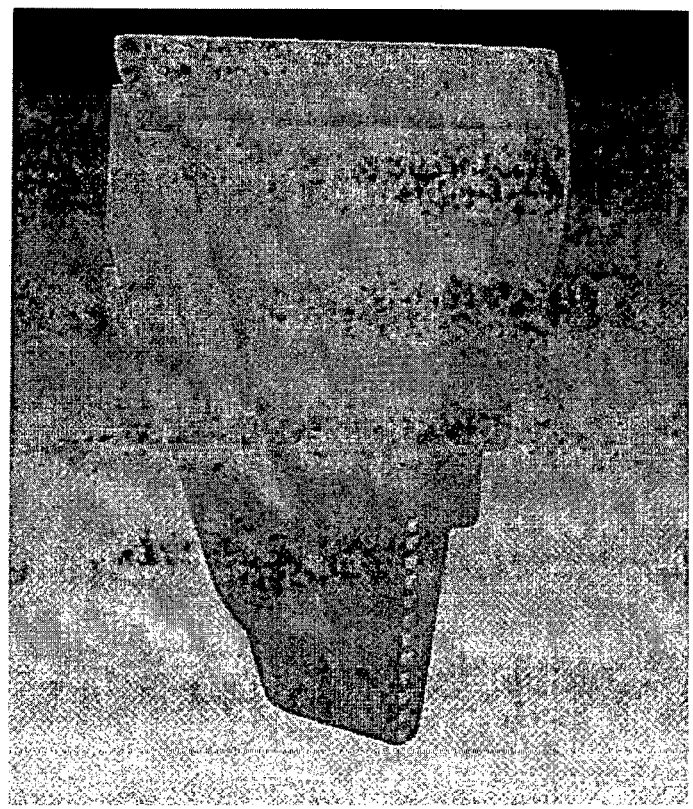
Figure 9:
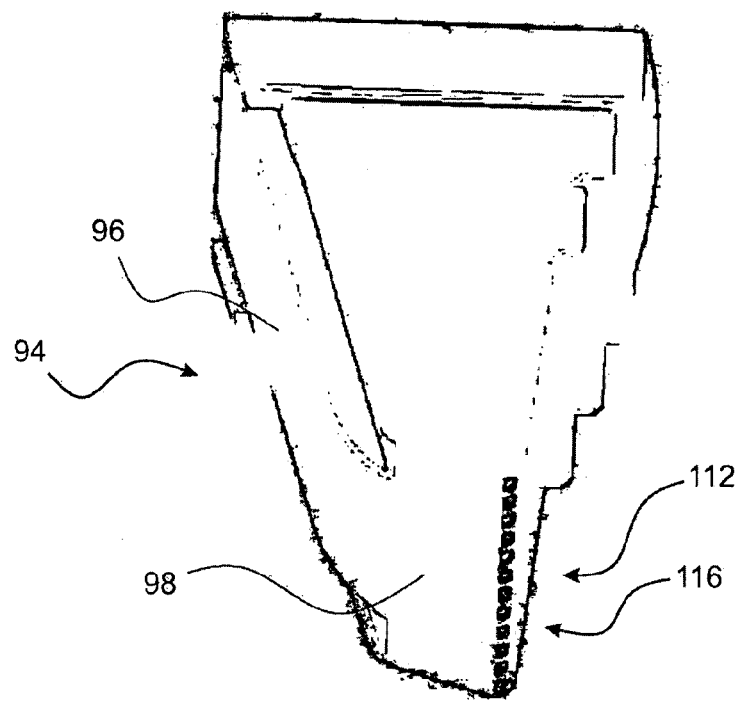

FIGS. 8a to 8b and 9 illustrate a garden module 94 according to a further preferred embodiment of the present invention. The garden module 94 is considered to provide an advantageously improved garden module in comparison to the garden module 10.

Firstly as shown in FIGS. 8a and 8b, the garden module 94 includes a back portion 96 arranged to be vertically positioned so as to follow a wall. The garden module 94 further includes a base portion 98 angled relative to the back portion 96 at an angle 100 greater than 30 degrees. The upper rim 102 of the garden module 94 is angled at an angle 104 greater than 15 degrees below horizontal. Furthermore the front portion 106 of the garden module is angled at an angle 108 greater than 50 degrees above the horizontal. These angles advantageously provide the lower portion 110 of the garden module with a lower pointed portion 112 having an angle 114 less than 90 degrees. By virtue of the relevant angles plant growth is advantageously encouraged to grow upwardly and outwardly.

As highlighted in FIG. 9 the garden module 94 includes a number of openings 116 adjacent the apex of the lower pointed portion 112, with the base portion 98 extending from the back portion 96 towards the openings 116. Each opening 116 diverges inwardly with a side wall angle of about 5 degrees.

Figure 10:
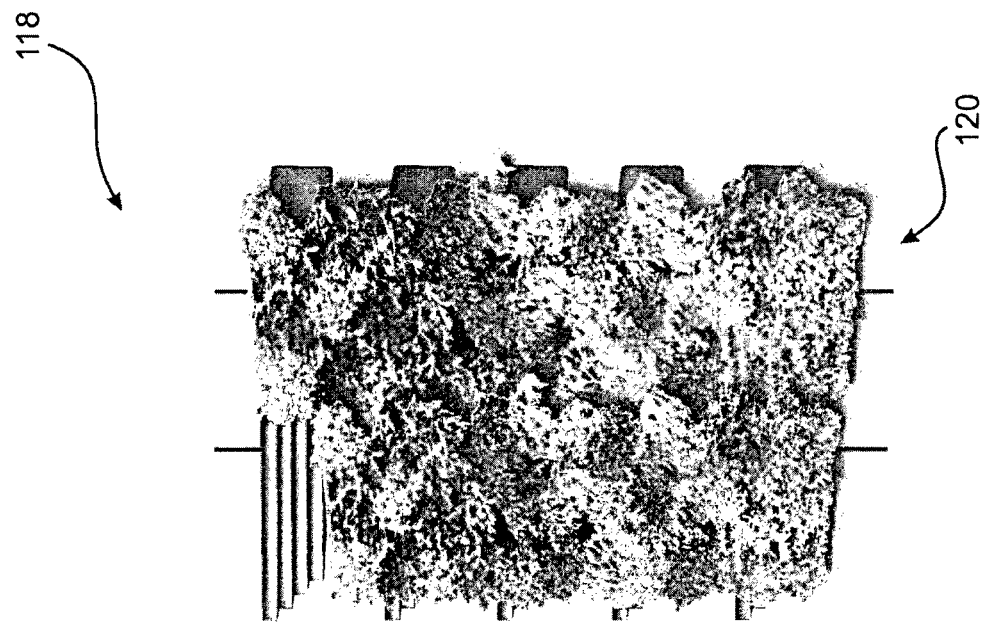
FIG. 10 provides an illustration of a method according to yet another preferred embodiment of the present invention.
Figure 10:
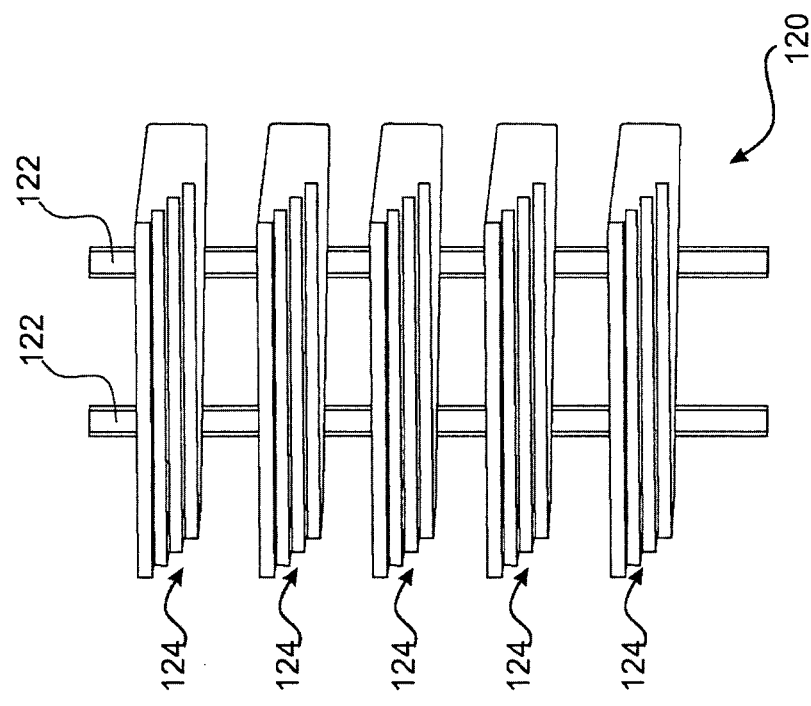

FIG. 10 illustrates a method 118 of installing a vertical garden system 120 according to a further preferred embodiment. In the method 118 two uprights 122 are fixed so as to extend vertically above the ground. A plurality of garden modules 124 are provided, each hiving a body with a back portion providing a mounting arrangement in the form of two vertically extending recessed portions for accommodating a respective upright 122. Each garden module 124 is positioned such that each vertically extending recessed portion thereof accommodates a respective upright 122. Following this the garden modules 124 are removably fixed in position by securing fasteners through openings in the garden modules 124 into the uprights 122.

As before, with the modules are movable along the uprights/racks. This is considered to provide significant advantages for the 'home handyman' vertical wall gardener. The applicant considers that the system provided the opportunity to grow a much greater variety of plants in a vertical gardening system. This is presently being confirmed by the applicant.

In general, preferred systems and methods of the present invention are considered to advantageously provide:
(i) Vertical garden systems having modules that are relatively readily installed and which do not require relatively complicated matt pocket and bag kits.
(ii) Vertical garden systems that encourage natural plant growth and provide a relatively large amount of growing medium.
(iii) Vertical garden systems that do not require relatively large amounts of liquid nutrients typically associated with unpleasant odours.
(iv) Vertical garden systems that are relatively readily manufactured and maintained and which provide a relatively natural method of growing so as to make the system particularly suited to the householder enjoying a vertical garden.
(v) Vertical garden systems in which plants are able to grow naturally in a relatively large amount of growing medium with the plants in each garden module growing vertically to cover the garden module above and create a continuous wall of plants.
(vi) Vertical garden systems that are considered not to require relatively large amounts of liquid nutrient and which are considered, as a result, to have a relatively pleasant much improved odour.

Further advantages and preferred features will be apparent from a reading of the specification as a whole. Other advantageous features are shown in the drawings.

It is to be recognised that various alterations and equivalent forms may be provided without departing from the spirit and scope of the present invention. This includes modifications within the scope of the appended claims along with all modifications, alternative constructions and equivalents. There is no intention to limit the present invention to the specific embodiments shown in the drawings. The present invention is to be construed beneficially to the applicant and the invention given its full scope.

In the present specification, the presence of particular features does not preclude the existence of further features.

The words 'comprising', 'including' and 'having' are to be construed in an inclusive rather than an exclusive sense.

The invention claimed is:

1. A garden module for a vertical garden system, the module comprising: a body having a back portion providing a mounting arrangement in the form of one or more vertically extending recessed portions, wherein when installed, a forward upper lip of a front portion of the body is located below an upper lip of the back portion of the body to provide an opening angle of between 15 and 30 degrees below horizontal.

2. A garden module as claimed in claim 1 wherein each vertically extending recessed portion extends substantially over the full height of the back portion and is configured to accommodate a respective upright of the vertical garden system.

3. A garden module as claimed in claim 2 wherein each vertically extending recessed portion includes an attachment portion for allowing attachment of the recessed portion to the respective upright of the vertical garden system, the attachment portion allowing for ready, installation and replacement of the garden module in the vertical garden system.

4. A garden module as claimed in claim 3 wherein each attachment portion comprises an aperture provided in an upper portion of the corresponding vertically extending recessed portion, each aperture being provided as a keyhole for receiving a fastener in a manner extending through the keyhole into the respective upright of the vertical garden system.

5. A garden module as claimed in claim 4 wherein the module includes precisely two vertically extending recessed portions for accommodating the respective uprights of the vertical garden system, the aperture provided in the upper portion of each vertically extending recessed portion advantageously allowing for a vertical height of the garden module to be readily varied in the vertical garden system.

6. A garden module as claimed in claim 5 wherein the vertical height of the garden module can be readily varied, in use, by sliding the garden module vertically up and down the uprights and then securing the garden module in position.

7. A garden module as claimed in claim 1 wherein the body includes a base portion, the base portion including a number of outlets spaced along the base portion to provide a top down watering arrangement, when the garden module is located above a lower garden module in the vertical garden system, such that water accumulating in the garden module is able to exit through the number of outlets and is directed towards the lower garden module.

8. A garden module as claimed in claim 7 wherein the base portion includes a lower accumulation portion shaped for ensuring that water exiting through the number of outlets does not travel back towards the back portion of the body where the water could damage a supporting wall or an upright.

9. A garden module as claimed in claim 8 wherein the lower accumulation portion has a radius of curvature for ensuring that water exiting through the number of outlets does not travel back towards the back portion of the body where the water could damage the supporting wall or the upright.

10. A garden module as claimed in claim 9 wherein the lower accumulation portion is inclined at an angle of more than 20 degrees and provides an internal acute angle of less than 90 degrees.

11. A vertical garden system comprising: a plurality of garden modules; precisely two uprights; each garden module having a back portion providing a mounting arrangement in the form of precisely two vertically extending recessed portions for accommodating a respective one of the precisely two uprights.

12. A vertical garden system as claimed in claim 11 wherein each vertically extending recessed portion extends substantially over the full height of the back portion for accommodating the respective upright of the vertical garden system.

13. A vertical garden system as claimed in claim 11 wherein each vertically extending recessed portion of the garden modules includes an attachment portion for allowing attachment of the vertically extending recessed portion to the respective one of the precisely two uprights, the attachment portions allowing for ready, installation and replacement of the garden modules in the vertical garden system.

14. A vertical garden system as claimed in claim 13 wherein each attachment portion comprises an aperture provided in an upper portion of each corresponding vertically extending recessed portion, each aperture being provided as a keyhole for receiving a fastener that extends through the keyhole into the respective one of the precisely two uprights of the vertical garden system.

15. A vertical garden system as claimed in claim 14 wherein the aperture provided in the upper portion of each vertically extending recessed portion advantageously allowing for a vertical height of the garden module to be readily varied in the vertical garden system.

16. A vertical garden system as claimed in claim 15 wherein the vertical height of each garden module can be readily varied, in use, by sliding the garden module vertically up and down the uprights as the spacing between the garden modules permits.

17. A vertical garden system as claimed in claim 11 wherein each garden module when installed has a forward upper lip of a front portion located below an upper lip of the back portion of the garden module to provide an opening angle of between 15 and 30 degrees below horizontal.

18. A vertical garden system as claimed in claim 11 wherein at least some of the plurality of garden modules comprise watering garden modules each including a base portion having a number of outlets spaced along the base portion to provide a top down watering arrangement when the watering garden module is located above a lower garden module in the vertical garden system such that water accumulating in the watering garden module is able to exit through the number of outlets in the base portion thereof and is directed towards the lower garden module.

19. A vertical garden system as claimed in claim 18 wherein the base portion of each watering garden module includes a lower accumulation portion shaped for ensuring that water exiting through the number of outlets of the base portion does not travel back towards the back portion of the watering garden module where the water could damage a supporting wall or one of the precisely two uprights.

20. A vertical garden system comprising: a plurality of garden modules; at least one upright each garden module having a back portion providing a mounting arrangement in the form of one or more vertically extending recessed portions for accommodating a respective one of the at least one upright, wherein at least some of the plurality of garden modules comprise watering garden modules each including a base portion having a number of outlets spaced along the base portion to provide a top down watering arrangement when the watering garden module is located above a lower garden module in the vertical garden system such that water accumulating in the watering garden module is able to exit through the number of outlets in the base portion thereof and is directed towards the lower garden module, wherein the base portion of each watering garden module includes a lower accumulation portion shaped for ensuring that water exiting through the number of outlets of the base portion does not travel back towards the back portion of the watering garden module where the water could damage a supporting wall or the at least one upright, and wherein the lower accumulation portion of each watering garden module has a radius of curvature for ensuring that water exiting through the number of outlets of the watering garden module does not travel back towards the back portion where the water could damage the supporting wall or the at least one upright.

* * * * *